Apr. 24, 1923.  1,453,233
C. M. BALL, JR
COUPLING FOR ELECTRIC LIGHT FIXTURES
Filed Jan. 26, 1922
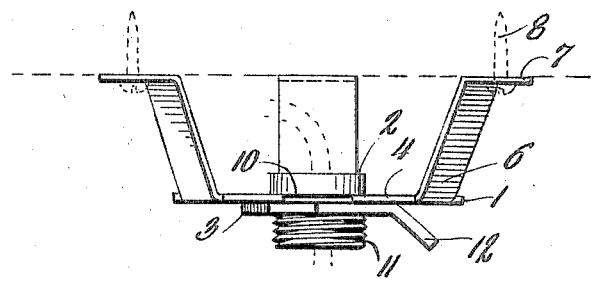
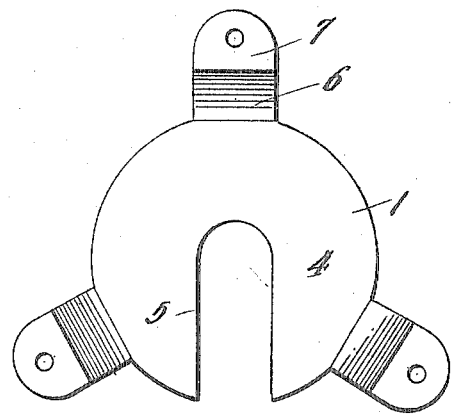
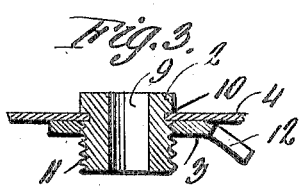   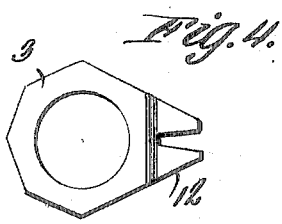
WITNESSES
Inventor
CHARLES M. BALL, JR.
By Richard R. Owen
Attorney Patented Apr. 24, 1923.

1,453,233

UNITED STATES PATENT OFFICE.

CHARLES M. BALL, JR., OF LOVELAND, COLORADO.

COUPLING FOR ELECTRIC-LIGHT FIXTURES.

Application filed January 26, 1922. Serial No. 531,882.

*To all whom it may concern:*

Be it known that I, CHARLES M. BALL, Junior, a citizen of the United States, residing at Loveland, in the county of Larimer and State of Colorado, have invented certain new and useful Improvements in Couplings for Electric-Light Fixtures, of which the following is a specification.

The present invention relates to couplings for electric light fixtures and has for its principal object to provide a simple, compact and inexpensive device of this nature which facilitates the mounting of an electric light fixture to the ceiling or wall.

Another object of the invention is to provide a device of this nature which allows the various parts to be readily assembled and disassembled.

With the above and numerous other objects in view, the invention resides in certain novel features of construction, and the combination and arrangement of parts as will be hereinafter more fully described and claimed.

In the drawing:—

Figure 1 is an elevation of the coupling,

Figure 2 is a plan view of the socket member,

Figure 3 is a detailed section taken through the block and a portion of the socket member, and Figure 4 is a plan view of the locking nut.

Referring to the drawing in detail it will be seen that the device consists of three parts, namely, the socket 1, the block 2 and the nut 3. The socket comprises the base disk 4 having a laterally opening socket or slot 5 therein and a plurality of inclined upwardly extending legs 6 which terminate in the feet 7 that extend in a plane substantially parallel with the plane of the base 4. These feet 7 are apertured so that the screws 8 or other suitable fastening devices may be passed therethrough in order that the socket member 1 may be held in from engagement with the ceiling or wall or other suitable support. The block 2 is in the form of a hollow sleeve having the vertical opening or bore 9 and an annular groove 10 adjacent its upper end. The lower end of the block is provided with threads 11 for receiving the nut 3. This nut 3 as shown in Figure 4 is provided with a bifurcated extension 12 so that a screw driver or some other implement may be placed in engagement therewith and the nut firmly screwed upon the threads 11 so as to hold the block 2 in locked engagement with the base 4 of the socket member 1 as is shown to advantage in Figures 1 and 3. The column of the electric fixture may be screwed upon the threads 11 or if so desired internal threads may be provided in the bore 9 for receiving this column. Any suitable covering may be provided for the coupling and of course such a covering is generally formed in some fanciful manner to conform with the design of the electric fixture.

Having thus described my invention what I claim as new is:—

A coupling for electirc fixtures comprising a flat base member having a laterally opening socket, a block having an annular groove adjacent one end so that the same may be slid laterally into said socket and having an opening, threads provided on the other end of said block exteriorly thereof, and a nut having an extension with a notched terminal disposed out of alignment with its body, said nut engaging said threads so as to hold said block in locked engagement with said base member.

In testimony whereof I affix my signature in presence of two witnesses.

CHARLES M. BALL, JR.

Witnesses:
  IVAL M. SUTTON,
  THOS. R. GLEESON.